United States Patent [19]

Miller

[11] 3,929,788
[45] Dec. 30, 1975

[54] SYNTHESIS OF 4,5-DIAMINOURACIL AND ITS SALTS

[75] Inventor: Richard C. Miller, Denver, Colo.

[73] Assignee: The Gates Rubber Company, Denver, Colo.

[22] Filed: July 2, 1973

[21] Appl. No.: 375,426

[52] U.S. Cl. .......................................... 260/256.4 C
[51] Int. Cl.² ........................................ C07D 239/10
[58] Field of Search .............................. 260/256.4 C Primary Examiner—Richard J. Gallagher
Assistant Examiner—James H. Turnipseed
Attorney, Agent, or Firm—Curtis H. Castleman, Jr.; Raymond Fink; H. W. Oberg, Jr.

[57] ABSTRACT

A process is described for preparing 4,5-diaminouracil or its salts by reacting an acetate derivative of 4,5-diaminouracil with concentrated specified mineral acids at elevated temperatures to form the desired product in good yields and attained in high purity.

12 Claims, No Drawings

SYNTHESIS OF 4,5-DIAMINOURACIL AND ITS SALTS

BACKGROUND OF THE INVENTION

The principal prior art procedures for synthesizing 4,5-diaminouracil involve either base hydrolysis of the acetate derivative of diaminouracil in 6N NaOH, or acid hydrolysis with dilute HCl or certain other dilute acids. See, for instance, H. Bredereck, I. Hennig and W. P. Fleiderer, *Chemische Berichte*, 86, 321 (1953). The dilute acid hydrolysis procedure has proved to be unsatisfactory primarily because of extremely low yields, generally less than about 70 percent; the remainder of the product mixture contains various side products due to decomposition of the starting material. Such decomposition is evidenced during the course of the reaction by evolution of ammonia.

The base hydrolysis procedure also suffers from serious drawbacks including low yields and difficult separation of the product from admixed by-products which are formed during the reaction. A principal by-product formed is 8-methylxanthine, present in yields of about 5-15 percent by weight. This xanthine derivative is particularly difficult to separate from the desired diaminouracil product. Other base hydrolysis side products include the rusty orange colored 2, 4, 5, 7-tetrahydroxypyrimidino (5-4g) pteridine and 2, 4, 6, 8-tetrahydroxypyrimidino (4-5g) pteridine. Furthermore, during work-up of the product acidification of the basic solution produces large amounts of sodium chloride.

The prsent invention has as its primary object the provision of a method for producing 4,5-diaminouracil and its salts in high yields, excellent purity and with substantially no organonitrogen side product formation thus enabling easy separation and recovery of the product.

SUMMARY OF THE INVENTION

IN one aspect, the invention contemplates a process for the preparation of 4,5-diaminouracil or its salts by reacting an acetate derivative of 4,5-diaminouracil with sulfuric acid having a concentration of at least about 80 percent at a temperature in the range from about 90° to about 120°C. In another aspect, the invention contemplates preparation of 4,5-diaminouracil or its salts by reacting an acetate derivative of 4,5-diaminouracil with concentrated hydrobromic acid or hydrochloric acid at elevated temperatures. The invention is principally based on the discovery that acid hydrolysis of the acetate derivatives at high concentrations of the acid produces reation product mixtures with very high yields of product and the substantial lack of organonitrogen side products which were customarily present in the art and caused difficult separations.

4,5-diaminouracil and its salts are important intermediates in the synthesis of purines, pyrimidines, and pteridines. For instance, treating 4,5-diaminouracil with formamid produces xanthine which has known utility. Furthermore, 4,5-diaminouracil sulfate is an effective algaecide against a number of taste and odor causing algea, filter clogging algae, and polluted water algae; in this respect see U.S. Pat. No. 3,753,362 (S. N. 88,095, filed Nov. 9, 1970 by Applicants' assignee).

PREFERRED EMBODIMENTS OF THE INVENTION

The products of this invention include 4,5-diaminouracil

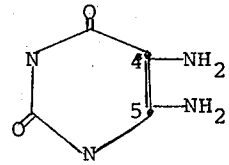

and its salts including the sulfate ($H_2SO_4^-$), hydrogen chloride (HCl) and hydrogenbromide (HRr) salts. The product is normally handled and stored in one of its manageable derivative forms such as a salt form to render stability and to prevent self condensation.

The starting material acetate derivatives of 4,5-diaminouracil are well known and may be prepared in known manner by treatment of uric acid with acetic anhydride and pyridine, which normally forms the triacetate derivative. Addition of boiling water converts the triacetate to the diacetate form. In general, any of the mono, di or tri acetate derivatives or mixtures thereof are useful starting materials according to the subject invention. The acetate radicals are substituted on the nitrogen atoms attached at the 4 and 5 positions of the uracil ring structure.

In accordance with the invention, the acetate derivative of 4,5-diaminouracil is reacted with a mineral acid in high concentration at elevated temperatures. At the present time, Applicant is aware of only three mineral acids which are suitable, namely sulfuric, hydrobromic, and hydrochloric, in descending order of preference. The concentration of the acid is critical, it having been discovered that high acid concentrations do not catalyze decomposition reactions, in contrast to what would be normally expected particularly in view of the results obtained utilizing dilute acids. When using sulfuric acid, the concentration is at least about 80 percent by weight, more preferably at least about 85 percent by weight, and most preferably at least about 90 percent by weight. When using HBr or HCl it is preferred that they are used in substantially concentrated form, i.e. about 47–49 percent by weight and approximately 37 percent by weight, respectively. While normally stoichiometric amounts of reactants are employed, stoichiometric excesses of acid may be employed to improve conversions.

Temperature is another important reaction parameter. When utilizing sulfuric acid, the temperatures are preferably maintained in the range from about 90° to about 120°C, more preferably from about 100° to about 120°C, and most preferably from about 110° to about 120°C. Temperatures substantially above 120°C result in significant evolution of ammonia, indicating decomposition of the uracil in the reaction vessel. Below 90°C the amount of product produced is negligible. In the case of HBr, the temperatures are preferably maintained from about 70°C up to the reflux temperature of the acid, generally below 110°C, the temperature more preferably being held in the range between 80° and 100°C. HCl is more difficult to use because it tends to volatilize at operating temperatures, and thus is preferably held at an elevated temperature at or slightly below approximately the reflux temperature of HCl; the use of superatmospheric pressure is helpful to maintain the hydrogen chloride in solution.

The period of reaction is normally variable and depends on temperature, pressure and starting materials, although in general reaction time will be from about 5 to about 20 minutes. When the reaction is complete, the reaction mixture is preferably cooled, such as by inserting the reaction vessel in an ice bath at 15°–20°C. The product may then be precipitated by addition of water, although it is preferred to add an antioxidant salt which has the function of changing the solubility of the product in the reaction mixture and causing its precipitation, together with the function of inhibiting oxidation of the product which is normally a problem. Suitable antioxidant salts include the sulfites and bisulfites such as sodium sulfite or sodium bisulfite. When the water/sodium sulfite solution has been added, the 4,5-diaminouracil salt precipitates out of solution and may be collected by filtration, for instance, in high purity.

The following examples are illustrative of preferred embodiments of the invention.

EXAMPLE I

The acetate (mono, di, or tri) of 4,5-diaminouracil is added to concentrated (96 percent by weight) $H_2SO_4$ with mechanical stirring. The temperature is kept below 45°C until all of the acetate is in solution. As soon as the acetate is in solution, the reaction mixture is heated to 120°C and held at this temperature for 5 minutes. The reaction mixture is then cooled to 15°–20°C in an ice bath. Ice water is then added to the reaction mixture at a rate adequate to keep the temperature below 45°C. The amount of ice water added is about 3 times the volume of the original reaction mixture. After one-half of the ice water has been added, $NaSO_3$ is added, and when the full amount of water and sodium sulfite has been added, the 4,5-diaminouracil sulfate precipitates out of solution and is collected by filtration. The precipitate is then washed with ice water and once with aectone producing a product of 83 percent yield and 98+ percent purity. The structure of the product is identified as 4,5-diaminouracil sulfate by IR spectra.

EXAMPLE II

The diacetate derivative of 4,5-diaminouracil is added to concentrated HCl with mechanical stirring. The temperature is raised slowly until complete solution of the acetate is effected. The maximum temperature during the reaction is reflux. The 4,5-diaminouracil hydrochloride salt precipitates out of the reaction mixture and is collected by filtration. The time required for the precipitate to form is 15 minutes. The identity of the 4,5-diaminouracil salt is confirmed by IR spectra.

EXAMPLE III 4,5-diacetylaminouracil is added to concentrated (47–49 percent by weight) HBr with stirring. The diacetate goes in the solution when the temperature reaches 50°C. When the temperature reaches 55°C, an NMR is taken, showing no change. The NMR analysis is again taken at 80°C showing an increase in acetic acid formation with a decrease in diacetate starting material. Between 80°–90°C, a precipitate forms but goes back into solution at 90°–100°C. An NMR is taken at 90°C showing a further increase of acetic acid concentration and a decrease in the concentration of the diacetate starting material. At 110°C no diacetate is present, and a further increase of acetic acid is found. At this latter temperature, ammonia is detected which shows decomposition is beginning to take place. The reaction mixture is cooled at this time to room temperature and a precipitate forms. This precipitate is collected and found to be the hydrobromide salt of diaminouracil, with some ammonia present, as confirmed by IR spectra. The reaction time is about 10 minutes.

EXAMPLE IV

A reaction is run essentially identical to that of Example III, above, with the exception that the temperature is held in the range of 75–80°C. A precipitate is again formed but does not go back into solution. An NMR analysis is taken every 10 minutes to find out when the reaction is complete and to see if decomposition occurs. The reaction appears to be complete after about 15–20 minutes. The formation of ammonia is not detected until after 30 minutes has elapsed.

EXAMPLE V

In this Example, 4,5-diaminouracil sulfate is prepared utilizing different acid concentrations. Three different concentrations of the sulfuric acid are utilized, namely 86 percent by weight, 76 percent by weight, and 66 percent by weight.

Case 1 (86 percent concentration): The reaction is run according to the procedure of Example I, except that the temperature is held at 120°C until the reaction is complete. The product is found to be a very pure 4,5-diaminouracil sulfate, and no decomposition is observed, even though the temperature is held at 120°C for 15 minutes. NMR analysis confirms the presence of the desired product. The yield obtained is 83 percent.

Case 2 (76 percent concentration):

The reaction is run in the same manner as Case 1. After holding the reaction mixture at 120°C for 10 minutes, the reaction rate appears to be much lower than in Case 1 and the presence of ammonia is readily detectable, indicating decomposition. The reaction is allowed to continue for an additional 10 minutes resulting only in a rise in concentration of ammonia and no increase in the desired 4,5-diaminouracil sulfate.

Case 3 (66 percent concentration):

The reaction is run in the same manner as the two previous cases. After a reaction time of 7 minutes at 120°C, ammonia evolves and there is very little conversion of starting material to 4,5-diaminouracil sulfate. After 15 minutes no starting material is left and only a very small amount of product is present. The rest of the starting material has decomposed. The product is of a very poor quality, approximately 50 percent pure and producing only a 16 percent yield.

While the foregoing examples describe the invention of a batch basis, it may, of course, be practiced on a continuous basis with continuous flows of starting material into the reactor.

It will be understood by those skilled in the art that a variety of modifications and variations within the scope of the invention will be become apparent upon the reading of this specification.

What is claimed is:

1. A process for preparing 4,5-diaminouracil or its sulfate salts comprising the step of reacting an acetate derivative of 4,5-diaminouracil, whose acetate substituents are attached to at least one of the amino nitrogens, with sulfuric acid having a concentration of at least about 80 percent by weight at a temperature in the range from about 90° to about 120°C.

2. A process for preparing 4,5-diaminouracil sulfate comprising the steps of:
reacting an acetate derivative of 4,5-diaminouracil, whose acetate substituents are attached to at least one of the amino nitrogens, with sulfuric acid having a concentration of at least about 85 percent by weight at a temperature in the range from about 110° to about 120°C to form a reaction mixture;
cooling the reaction mixture;
adding an aqueous solution of sulfite or bisulfite salt to the reaction mixture while maintaining the temperature below about 45°C thereby forming a precipitate of 4,5-diaminouracil sulfate; and
thereafter separating and recovering 4,5-diaminouracil sulfate.

3. A process for preparing 4,5-diaminouracil or its hydrogenbromide salts comprising reacting an acetate derivative of 4,5-diaminouracil, whose acetate substituents are attached to at least one of the amino nitrogens, with substantially concentrated HBr at a temperature in the range from about 70° to about the reflux temperature of the HBr.

4. A process of preparing 4,5-diaminouracil or its hydrogen chloride salts comprising the step of reacting an acetate derivative of 4,5-diaminouracil, whose acetate substituents are attached to at least one of the amino nitrogens, with substantially concentrated HCl at elevated temperatures at or slightly below approximately the reflux temperature of HCl.

5. The process of claim 4 wherein the reaction is conducted under superatmospheric pressure.

6. The process of claim 1 wherein the temperature is maintained in the range of about 100° to about 120°C.

7. The process of claim 1 wherein the temperature is maintained in the range of 110° to about 120°C.

8. The process of claim 1 wherein the derivative is the diacetate of 4,5-diaminouracil.

9. The process of claim 1 wherein the derivative is the triacetate of 4,5-diaminouracil.

10. The process of claim 1 wherein the reaction produces a mixture comprised substantially of the desired product and acetic acid devoid of organonitrogen side products thereby enabling easy separation and recovery of the product in high purity and yield.

11. The process of claim 1 wherein the concentration of the sulfuric acid is at least 90 percent by weight.

12. The process of claim 1 wheren the reaction mixture formed is cooled followed by addition of a salt which causes the product to precipitate together with inhibiting oxidation of the product.

* * * * *